United States Patent Office 3,337,233
Patented Aug. 22, 1967

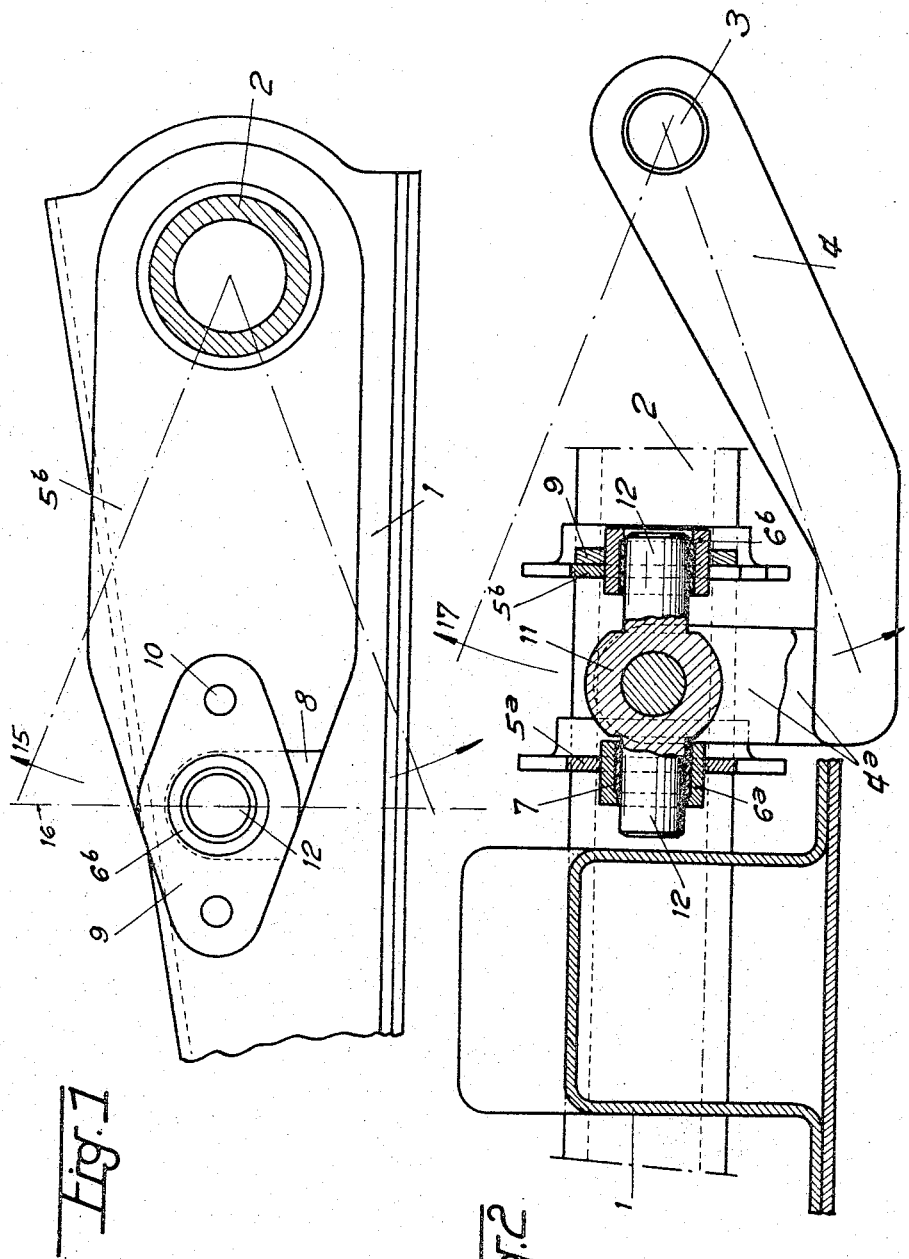

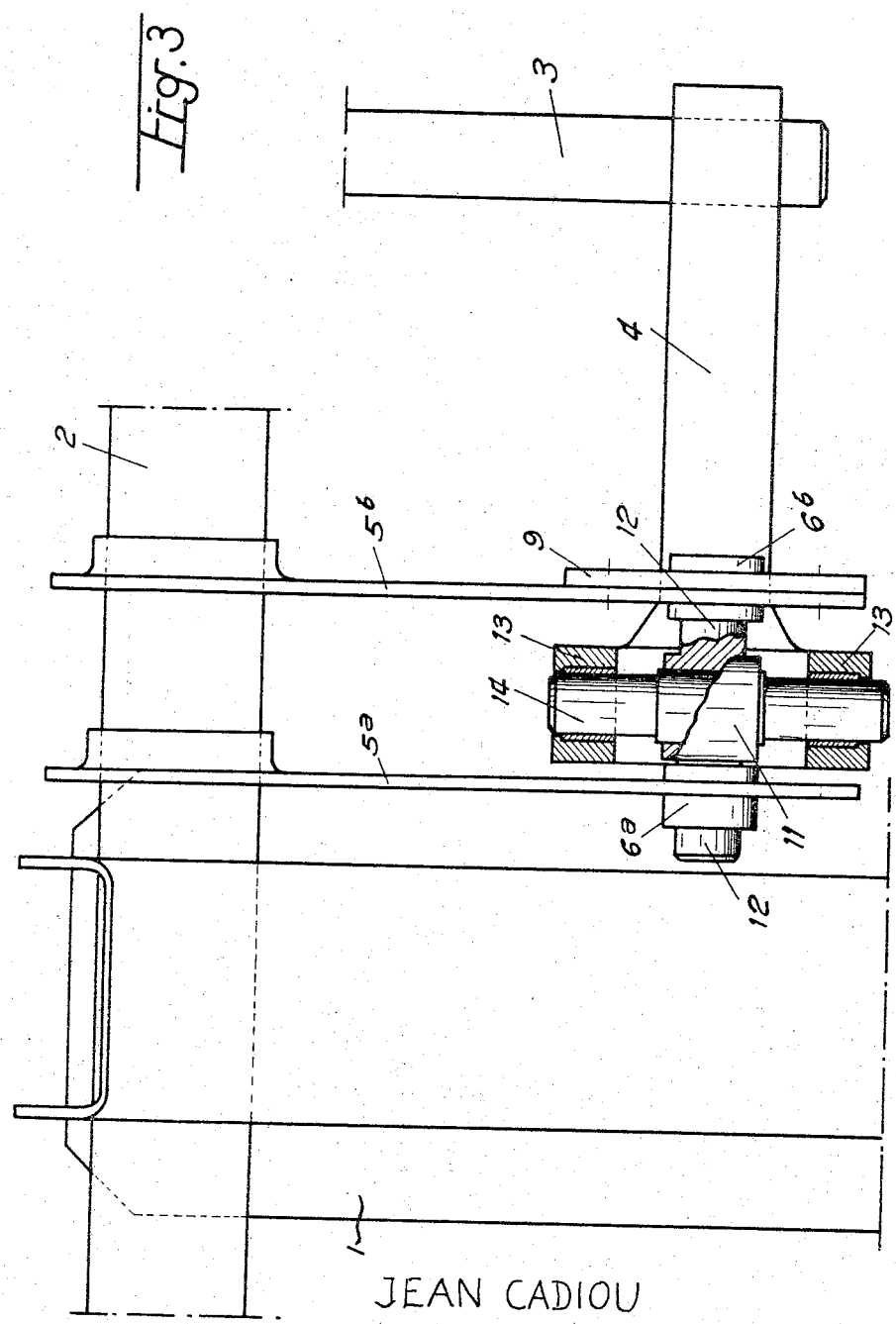

3,337,233
ANTI-ROLL DEVICE FOR VEHICLES
Jean Cadiou, Paris, France, assignor to Societe Anonyme Andre Citroen, Paris, France, a corporation of France
Filed Oct. 6, 1965, Ser. No. 493,464
Claims priority, application France, Oct. 12, 1964, 3,150
4 Claims. (Cl. 280—96.2)

This invention relates to anti-roll devices for vehicles.

In order to oppose the rolling motion of automobiles, it is usual to provide a torsion bar arranged transversely of a vehicle and provided at each of its ends with an arm connected to an arm of the axle situated on the same side. Now, the arm of the axle and the torsion arm generally have different trajectories and may even, which is very common, be situated in different planes. It is therefore necessary that the means used for interconnecting them must allow for this difference in the trajectories; to this end there have been proposed couplings with links, rollers or of rubber, but these methods of connection give rise to a number of difficulties, especially with regard to the points of action and their resistance to wear.

The present invention relates to an improvement on anti-roll torsion-bar devices and its object is to overcome these difficulties.

According to the present invention there is provided, in an anti-roll torsion-bar device for an automobile, a torsion arm, a wheel-carrying arm, a cross-shaped member, first bearing means carried by the torsion arm, and second bearing means carried by the wheel-carrying arm, said cross-shaped member being pivotally engaged in said first and second bearing means with a limited degree of axial play therein.

An embodiment of the invention is described hereafter, by way of non-limiting example, with reference to the accompanying diagrammatic drawing; in which:

FIG. 1 is a fragmentary elevational view of a support arm for a wheel;

FIG. 2 is a fragmentary view in section of this support arm and its connection with the torsion arm; and FIG. 3 is a view in plan, with parts broken away and shown in section.

In the drawing, there is seen a wheel-supporting arm 1 which is fixed on a shaft 2 pivotally mounted with respect to the chassis of the vehicle and extending substantially parallel to the longitudinal axis of the vehicle. An anti-roll bar 3, which is disposed transversely with respect to the longitudinal axis of the vehicle, has at each of its ends an arm 4 connected to the support arm 1 for the corresponding wheel, as described hereinafter.

Two arms 5a and 5b are fixed to the shaft 2, facing one another in such a manner that they are displaced at the same time as the support arm 1 of the wheel. In the region of its free end, the arm 5a carries a metal bearing 6a which is coated internally with a plastics material 7 with low co-efficient of friction such as that known in commerce under the name "Teflon" (polytetrafluoroethylene). Opposite this bearing 6a, the arm 5b has a recess 8 which is covered by a plate 9. The latter is fixed to the arm 5b so that it can readily be removed, for example by means of screws indicated at 10, and carries a bearing 6b similar to the bearing 6a and co-axial therewith.

A cross-piece 11 is integral with two pivot pins 12 journaled in the bearings 6a and 6b; its mounting has a degree of axial play, as indicated in FIG. 2, in such a manner that the cross-piece 11 can be displaced, with respect to the support arm 1 for the wheel, parallel to the axis of the pivot pins 12. In order to mount this member, the plate 9 is removed, one of the pivot pins 12 is engaged in the bearing 6a and the cross-piece 11 is placed in position, the other pivot pin 12 sliding in through the recess 8. It only remains to engage the bearing 6b on the latter pivot pin and to resecure the plate 9 on the arm 5b.

The arm 4 of the anti-roll bar 3 terminates in a bifurcate yoke 4a. The end of each leg of this yoke carries a bearing bushing 13 similar to the bearing bushings 6a and 6b, and like the latter they are coated internally with a plastic material with a low coefficient of friction. This yoke is secured to the cross-piece 11 by a pin 14 which engages in the bearings 13 and in a bore of the element 11 on an axis perpendicular to that of the bearings 6a and 6b; this pin is mounted tightly in the cross-piece 11. As can be seen from FIG. 3, the mounting affords a degree of axial play as that the member of the cross-piece 11 can be displaced with respect to the arm 4 in a direction parallel to the axis of the pin 14.

When the support arm 1 of the wheel pivots, it carries the cross-piece 11 with it, as indicated by the arrow 15 in FIG. 1; the cross-piece carries in turn the arm 4 which applies torsion to the bar 3. The distance of the cross-piece from the axis of the shaft 2 remains constant during this movement whilst the pivots 13 are displaced in planes parallel to the plane 16 of the arm 4 (FIG. 1), the pin 14 sliding axially in the bearings 13. Similarly, the distance of the cross-piece to the axis of the bar 3 remains constant, as indicated by the arrow 17 of FIG. 2, the pivots 12 sliding axially in their bearings 6a and 6b.

I claim:

1. In an anti-roll torsion-bar device for an automobile, in combination:
   a torsion bar,
   a torsion-arm connected at one end to said torsion bar,
   a wheel-carrying arm,
   a cross-shaped member,
   first bearing means carried by the other end of said torsion arm, and
   second bearing means carried by the wheel-carrying arm,
   said cross-shaped member being pivotally engaged in said first and second bearing means with a limited degree of axial play for permitting relative pivotal movement of said arms about two axes.

2. The combination defined in claim 1, further comprising a low-friction coating in each of said bearing means.

3. The combination defined in claim 2 wherein said coating consists of polytetrafluoroethylene.

4. In an anti-roll torsion-bar device for a vehicle, in combination:
   a wheel-carrying member,
   a pair of spaced parallel arms,
   a shaft perpendicular to said member and said arms,
   means securing said member to said shaft,
   means securing said arms to said shaft,
   a first bearing bushing mounted on one of said arms, a second bearing bushing coaxial with the first bearing bushing mounted on the other of said arms,
a torsion bar,
a torsion arm having one end fast with the torsion bar,
a bifurcated yoke rigid with the other end of said torsion arm,
a third bearing bushing mounted in said yoke,
a fourth bearing bushing in said yoke coaxial with and spaced from said third bearing bushing, and
four pivot pins assembled to form a cross-piece, each of said pivot pins being pivotally mounted in one of said bearing bushings with a limited degree of axial sliding movement.

References Cited
UNITED STATES PATENTS

| | | | |
|---|---|---|---|
| 2,254,325 | 9/1941 | Slack | 267—11 |
| 2,961,253 | 11/1960 | Allison | 280—96.2 |
| 3,123,348 | 3/1964 | Hilderandt | 267—16 |

BENJAMIN HERSH, *Primary Examiner.*

P. GOODMAN, *Assistant Examiner.*